March 27, 1951  F. A. FAUST  2,546,891
APPARATUS FOR TIMING THE PASSAGE OF A LIQUID
Filed Aug. 30, 1945

TO FLOW-DIVERSION VALVE

INVENTOR.
Frederick A. Faust
BY
E. C. Sanborn
Attorney

Patented Mar. 27, 1951

2,546,891

UNITED STATES PATENT OFFICE 2,546,891

APPARATUS FOR TIMING THE PASSAGE OF A LIQUID

Frederick A. Faust, Woodbury, Conn., assignor to The Bristol Company, Waterbury, Conn., a corporation of Connecticut Application August 30, 1945, Serial No. 613,569

3 Claims. (Cl. 161—18)

This invention relates to timing the passage of liquid through a conduit, and more especially to the determination of time during which any portion of a circulating liquid is maintained under a predetermined condition. In the pasteurization of milk, for example, a common practice involves continuous circulation of the milk through a circuit or conduit system comprising a heater, a cooler, and an interposed section of conduit in which it is required that the temperature of the milk be maintained within specific limits corresponding to passage for a predetermined period of time. The U. S. Public Health Service requires that milk being pasteurized must be held at a temperature of 161° F. or higher for a time period of 15 seconds, which means that it must take 15 seconds for any selected portion of the milk to travel from the heater outlet through the intermediate conduit section to the inlet of the cooler. This represents a reduction in flow rate considerably below the velocities ordinarily used in the piping system; and the slowing down is accomplished by utilizing, for the conduit, a section of pipe having an enlarged section and providing sufficient length to give a 15 seconds time of passage. Part of the rigorous inspection system of the Health Service includes a check of the holding time to make sure that the milk remains at a pasteurization temperature for at least 15 seconds.

Various expedients have been tried for the purpose of effecting a simple test on the holding time, some of these including filling the piping system with water and injecting a color solution whose rate of progress through the system can be observed, while others involve introducing a "slug" of material which affects the electrical conductivity of the circulating liquid to an extent where the more or less abrupt change in conductivity may be observed successively at two separated points, and utilized through suitable instrumentalities for the purpose of determining the time of passage of the liquid through the conduit. It will be apparent that tests of this nature require either that the milk stream be temporarily replaced by water, which, differing in density and viscosity from the milk, may have quite different flow characteristics under identical pumping and conduit conditions, or that the milk be momentarily contaminated by a foreign substance, of which it will, of course, be necessary that all traces be removed before normal operating conditions can be reestablished.

It is an object of the present invention to provide means whereby the holding time of the milk under conditions of pasteurization may be determined at any time on the actual milk being processed, and without contamination of the milk.

It is a further object to provide means whereby determination of the holding time may be wholly automatic in operation.

It is a further object to provide means whereby the holding time may be permanently recorded on a graphic chart available for future reference.

In carrying out the purposes of the invention it is proposed to utilize temperature-sensitive elements inserted in the milk stream at spaced-apart locations, and to obtain a measure of the time interval between responses of the respective elements to a momentarily introduced fluctuation of the temperature of the circulating stream of liquid.

Figure 1:
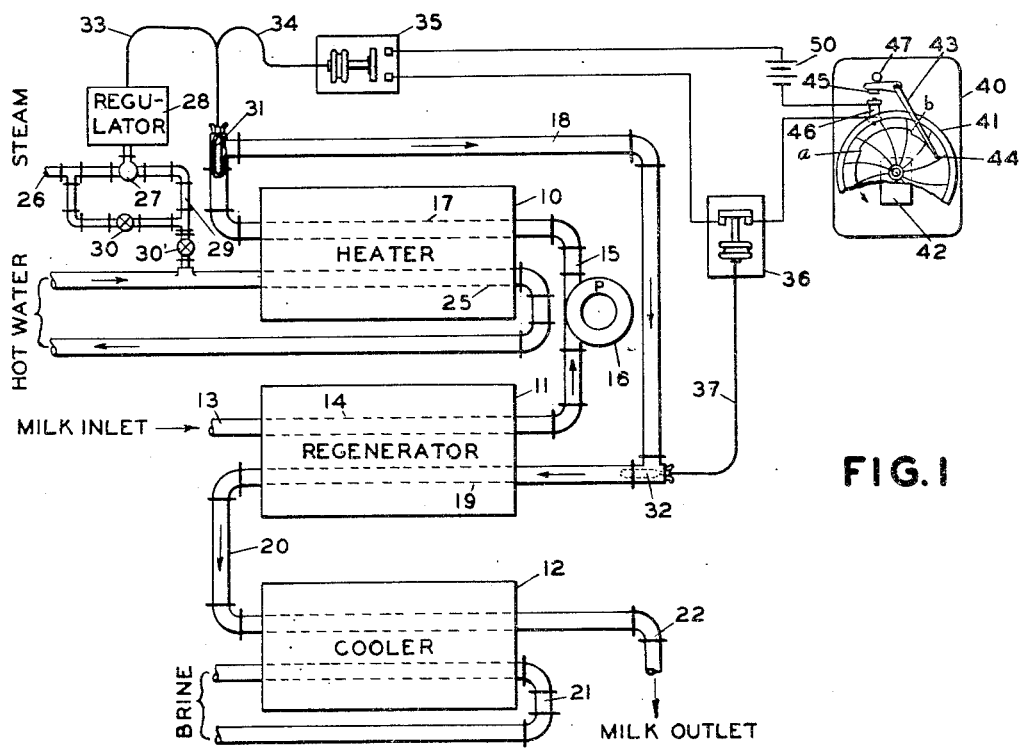
Fig. 1 is a diagrammatic representation of a milk pasteurization system including the invention in one of several possible forms.

Referring now to the drawings; in Fig. 1 are shown three interrelated heat exchangers, these being respectively a heater 10, a regenerator 11 and a cooler 12. The interconnection of these units is as follows: A supply of milk is continuously admitted to the regenerator 11 through a conduit 13, whence it passes through a heat exchange coil 14 within the regenerator and thence through a conduit 15, including a circulating pump 16, through a heat-exchange coil 17 in the heater 10, and thence through an extended conduit or "holding section" 18 to re-enter the regenerator 11 and pass through a coil 19 in thermal association with the coil 14. The stream of milk emerging from the coil 19 is carried by a conduit 20 through the cooler 12 where it is exposed in heat-exchange relationship to a flow of brine in a conduit 21, the milk emerging through a conduit 22 which forms the final outlet of the system.

Within the heater 10 is a heat-exchange coil 25 in thermal association with the coil 17, and adapted to carry a circulating flow of hot water, whereby to raise the temperature of the milk in the coil 17 to a suitable value. The temperature of the water within the coil 25 is regulated by the controlled admission of steam from a source 26 through valve 27, forming a part of a regulator 28, and then through a conduit 29 into the circulating system of which the heat exchange coil 25 forms a part. The regulator valve 27 is by-passed by a manually operable valve 30, whereby more or less of the flow of steam from the source 26 to the coil 25 may be diverted from the regulated valve 27. A shut-off valve 30' in the conduit 29 makes it possible at any time to interrupt completely the admission of steam into the water system.

At the extremity of the holder section 18 nearest the outlet of the heater 10 is inserted a temperature-sensitive thermometer bulb 31, whereby to provide a measure of the temperature of the milk entering the holder section. At the opposite extremity of the holder section 18 is a similar temperature-sensitive bulb 32, adapted to provide a measure of the temperature of the milk as it leaves the section 18 to enter the coil 19 in the regenerator 11. The bulb 31 is operably connected by means of a capillary tube 33 to the regulator 28 whereby to render the action of the valve 27 responsive to the temperature of the bulb 31 and thus, acting to well-known principles of automatic control, to make possible the regulations of the temperature of the milk emerging from the heater 10 to a definite and predetermined value. The bulb 31 communicates also by means of a capillary tube 34 with a pressure switch 35, having electrical contacts, and adapted to complete a circuit between the same when the temperature to which the bulb 31 is exposed exceeds a predetermined value slightly above the normal pasteurization temperature. A pressure switch 36 operatively connected to the bulb 32 by means of a capillary tube 37, is provided with electrical contacts adapted normally to be in a closed circuit, and to open said circuit when the temperature to which the bulb 32 is exposed slightly exceeds said pasteurization temperature.

A time recording instrument 40 is provided with a chart element 41 continuously driven at a uniform speed by means of a clock or similar time motor 42. Pivotally mounted within the instrument 40 and adapted for deflection through a limited angle is a pen arm 43 provided with a pen or stylus 44 whereby to inscribe on the chart 41 a record of its deflections about its pivotal mounting. Carried by the pen arm 43 is a ferromagnetic armature 45 movable in the field of an electromagnet 46, and normally restrained away from said magnet against a fixed stop 47, by means of a spring or equivalent resilient element not shown in the drawing. The magnet 46 is adapted for energization from a battery or other source of electrical power through a suitable circuit, including in series the contacts of the pressure switches 35 and 36.

For the purpose of explaining the operation of the apparatus in the form shown in Fig. 1, it may be first assumed that there has been established a steady-state condition wherein, under influence of the pump 16, the milk is circulating through the system, entering at the conduit 13 and leaving at the conduit 22 as hereinbefore explained, and that by means of heated water circulating in the coil 25 of the heater 10 and having its temperature controlled by the regulated admission of steam from the source 26, the stream of circulating milk is maintained at a suitable pasteurizing temperature as determined by the bulb 31 to which the regulator 28 is sensitive. As hereinbefore pointed out, it is required that the milk be maintained at a pasteurization temperature for a predetermined time period (usually 15 seconds), before entering those parts of the circulating system wherein its temperature is allowed to fall. The fulfillment of this condition is assured by coordinating the temperature measurements obtained at the bulbs 31 and 32, which correspond to the extremities of the holding section 18, to the extent that the temperature to which the latter bulb is exposed must not fall below the pasteurization value, and that the rate of flow of the milk stream is such that any selected portion thereof must require at least 15 seconds to pass from the bulb 31 to the bulb 32. Under normal conditions, as pointed out, the contacts of the pressure switch 35, which is responsive to the temperature at the bulb 31, will stand open, while those of the switch 36, responsive to the temperature at the bulb 32, will stand closed. Thus, the circuit of the electromagnet 46 in the time recorder 40 being incomplete, said magnet will remain deenergized and, with rotation of the chart 41, the pen 44 will tend to scribe on said chart an unbroken circular line. For the purpose of making a test in order to determine that a time interval of the required duration elapses between the passage of milk from one to the other of the bulbs, the temperature of the stream of milk emerging from the heater is momentarily raised to a value at which the contacts of the switch 35 will be closed. This may be done in any one of a number of ways. For example, the valve 30 may be manually opened, bypassing the regulating valve 27, and allowing a surplus of steam to be admitted to the water circulating system, whereby to increase its temperature, and therefore that of the milk in the coil 17, above the value to which the regulator 28 is set. Upon the heated portion of the milk stream reaching the bulb 31, the contacts of the switch 35 will be closed, completing a circuit through the normally closed contacts of the switch 36 and the electromagnet 46, whereby current from the battery 50 may pass through said electromagnet, energizing the same, and causing the pen 44 in the instrument 40 to be deflected laterally upon the surface of the chart 41, introducing a jog in the record corresponding to the time at which the switch 35 was actuated. This condition will continue until the overheated portion of the milk stream has passed through the holding section 18 and reaches the bulb 32, whereupon the switch 35 will be actuated in a sense to separate its electrical contacts, interrupting the magnet circuit, and allowing the pen 44 to be restored to its normal position on the chart, and introducing a second jog in the record. Such jogs or offsets in the record, corresponding to the actuation of switches 35 and 36 in succession, are indicated at a and b in Fig. 1. There is thus produced on the chart 41 a permanent record of the holding period; and this may at any time be read or scaled from the chart as a check upon established flow conditions.

Figure 2:
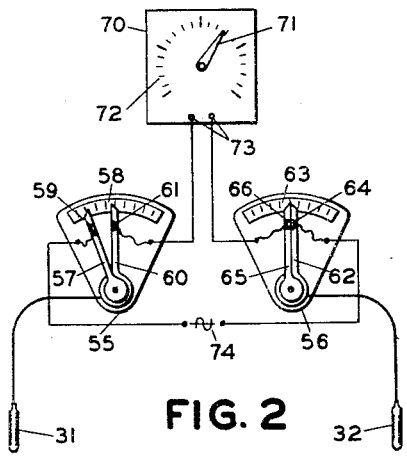
Figs. 2 and 3 are diagrams illustrating alternative forms of the invention.

In Fig. 2 is shown a modified form of the invention, wherein the pressure switches of Fig. 1 are replaced by indicating controllers, and the time recorder by an indicating time register. The bulbs 31 and 32, which are installed identically to the manner shown in Fig. 1, whereby to be exposed to milk temperatures at the inlet and outlet ends, respectively, of the holding section, are connected respectively to indicating controllers 55 and 56. The controller 55 is provided with an angularly deflectable pointer 57 movable with changes in the temperature to which the bulb 31 is exposed, and adapted to provide a measure of said temperature upon a graduated scale 58. The pointer 57 carries an insulated electrical contact 59. Mounted coaxially with the pointer 57 is an adjustable arm 60 having an index portion juxtaposed to the scale 58 and carrying an electrical contact 61 adapted to cooperate with the contact 59 in closing an electrical circuit when the temperature of the bulb 31, and indicated by the pointer 57 on the scale 58, rises to the value established by the setting of the arm 60 with respect to the same scale. The contacts carried by the pointer 57 and the arm 60 are connected by flexible conductors to suitable terminals on the controller 55, whereby said contacts may be incorporated in an external circuit.

The controller 56 includes an angularly deflectable pointer 62 providing on a graduated scale 63 a measure of the temperature to which the bulb 32 is exposed, and carrying an insulated contact 64. An arm 65 adjustable coaxially with the pointer 62, carries a contact 66, normally engaging the contact 64, and adapted to be separated therefrom when the temperature indicated by the pointer 62 exceeds a value established by the setting of the arm 65 with respect to the scale 63. Contacts 64 and 66 are connected by flexible conductors to suitable terminals in the controller 56, whereby to be incorporated in an external circuit.

A time-lapse register or chronometer 70 comprises a constant-speed motor (not shown in the drawing) adapted to advance an indicating pointer 71 with respect to a continuous scale 72, and includes an electrical circuit leading to external terminals 73, whereby the advance of said pointer will be a measure of the time duration of energization of said circuit. The internal mechanism may take the form of either a constantly running spring-driven clock, having an escapement, and provided with an electrically actuated clutch, whereby the pointer 71 is thrown into engagement with the clock only during such time as the circuit is energized, or it may consist in a conventional synchronous clock motor as, for example, the "Telechron" type, adapted for energization from a constant frequency alternating-current circuit, and to operate at a constant speed during such energization. Both these types of time meters are well known, and, being available in many commercial forms, need not here be further described.

The electrical connections by means of which the combination set forth in Fig. 2 is rendered operative consists in conductors whereby the terminals of the controllers 55 and 56 and the terminals 73 of the chronometer 70 are connected in series across a suitable source 74 of electrical energy. Assuming that the motor in the chronometer is of the synchronous clock type, the source will be alternating current of a regulated frequency, and is so indicated.

Operation of the apparatus shown in Fig. 2 is in all respects similar to that of the system shown in Fig. 1. Under steady-state conditions, the adjustable arms 60 and 65 in the respective controllers would be set slightly above the normal pasteurization temperature, so that the contacts 59—61 in the controller 55 would be open, and the contacts 64—66 in the controller 56 closed. The circuit of the chronometer 70 being incomplete, the pointer of the same will remain at rest. For the purpose of making a check test on the holding time, the temperature of the circulating milk is momentarily raised by means set forth in the explanation of Fig. 1, causing the controller 55 to respond and close its contacts 59—61. A circuit will thus be completed between the source 74 and the chronometer 70, whereby the pointer 71 will start to advance along the scale 72. After a lapse of time sufficient for the overheated portion of the milk to pass through the length of the holding section, and reach the bulb 32, the controller 56 will respond, causing the contacts 64—66 to be separated, opening the circuit, and bringing the pointer 71 to rest. The time of advance of said pointer, as measured along the scale 72 will thus become a measure of the time required for milk to pass from end to end of the holding section in the pasteurization system.

It will be obvious that in either of the embodiments of the invention, as shown in Figs. 1 and 2, it would be possible by suitable rearrangement of contacts in the pressure switches or the controllers, to render the same responsive upon a momentary fall, rather than a rise, in the temperatures of the circulating milk. The only reason for favoring the latter lies in the fact that, whereas an increase in temperature tends to accelerate pasteurization, and, if not too pronounced, has no deleterious effects on the milk, a fall in temperature will inhibit the desired action, resulting possibly in a sub-standard product.

Figure 3:
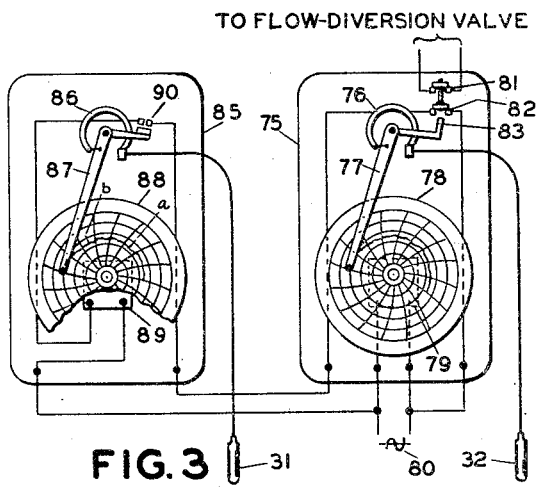

In Fig. 3 is shown a form of apparatus in which the novel features of the invention are combined with instrumentalities commonly found in conventional installations of pasteurizing equipment, and whereby the advantages accruing to the invention may be obtained in a novel manner, and with a minimum change from standard design. As in the hereinbefore described embodiments, the temperature-sensitive bulbs 31 and 32 are installed at inlet and outlet ends respectively of a holding section, to respond to the temperatures of the milk stream as it passes those points in the system. A common accessory of milk pasteurization systems is a flow-diversion valve, installed near the outlet end of the holding section and adapted upon a fall in the temperature of the milk stream at that point below the required value for correct pasteurization, to act automatically and divert the flow of milk from its normal course, so that insufficiently pasteurized milk will not be delivered as a completely treated product. Such a valve in its application to a pasteurization system is fully described and set forth in U. S. Letters Patent No. 1,859,504, granted May 24, 1932, to H. S. Fielder. In order that such a valve be made automatic in its operation, it is customary to make use of a controlling instrument responsive to temperature conditions at a location corresponding to that of the bulb 32 in the several embodiments of the present invention; and such an instrument may expediently take the form of a recording thermometer, providing a continuous record of temperatures, and also equipped with contact means whereby to render the flow-diversion valve operative in the event the outlet temperature should for any reason be reduced below the permissible pasteurization value.

In the form of the invention shown in Fig. 3 a combined recording and controlling instrument 75 is provided with a Bourdon spring or equivalent 76 adapted for actuation by the temperature sensitive bulb 32, and also with a recording pen 77 adapted for actuation thereby to inscribe on a continuously advancing chart 78 a permanent record of temperature values attained by said bulb. The chart 78 may be driven by any suitable form of clock or timing motor, and is indicated as advanced by a synchronous clock motor 79 receiving power from an alternating-current source 80 of regulated frequency. Included in the instrument 75 are two electrically independent sets of contacts 81 and 82 both normally maintained in a closed position and adapted to be opened by a tappet member 83 movable with the recording pen 77 when the temperature to which the bulb 32 is exposed falls below the minimum value permissible for effective pasteurization.

A recording instrument 85 is provided with a Bourdon spring 86 adapted for actuation by the temperature sensitive bulb 31, and also with a recording member 87 adapted for actuation thereby to inscribe on the surface of a movable chart 88 a trace of the positions it may assume with variation of temperature to which said bulb may be exposed. The chart 88 is adapted to be advanced at a relatively high speed (e. g. 1 revolution per minute) by means of a constant-speed motor 89, which may expediently be of the synchronous type, when said motor is energized from a suitable alternating-current power source which may be (though not necessarily) the source 80. A contact element 90 mechanically associated with the recording member 87 is normally maintained thereby in an open condition so long as the temperature at the bulb 31 is at or above the value required for pasteurization, and will be closed thereby when said temperature falls below the permissible value. The motor 89 is connected to the source 80 through a circuit including the contacts 82 and 90 in series. Contact 81 is connected in the actuating circuit of the flow-diversion valve, not shown in the drawing, to operate the same in the manner hereinbefore set forth upon a fall of outlet temperature below the required value; and if circuit conditions permit, the functions of contacts 81 and 82 may be incorporated in a single contacting unit.

Under normal operating conditions the apparatus shown in Fig. 3 will function in the following manner: The instrument 75 under the influence of the bulb 32 will produce on the chart 78 a continuous record of the temperature at said bulb as drawn by the recording member 77. So long as the temperature is sufficiently high for pasteurization purposes, the tappet 83 will remain out of engagement with the associated contact mechanism, and the contacts 81 and 82 will be closed. The recording member 87 in the instrument 85 will rest on the chart 88 in a position corresponding to the inlet temperature to which the bulb 31 is exposed. The contacts 90 being open, there will not be a complete circuit to the motor 89, which will consequently remain at rest; and, since the chart 88 is not advancing, the recording element, with such variations of temperature as may occur, will produce thereon a short radial line as at $a$. With the arrangement shown, the apparatus indicated in Fig. 3 is adapted for making a test of holding time by the operator momentarily lowering the temperature of the milk emerging from the heater. Referring for the moment to Fig. 1, it will be obvious that this can be accomplished by closing the valve 30' in the conduit 29, whereby to interrupt the flow of steam to the circulating water in the conduit 25. As the cooled portion of milk reaches the bulb 31 after its emergence from the heater, the recording element 87 in the instrument 85 will deflect in a down-scale sense through a distance corresponding to the temperature reduction, and this will continue until the contacts 90 have been closed. There will now be a complete circuit through the contacts 82 and 90 in series, whereby the motor 89 will be energized from the source 80, and will cause the chart 88 to be advanced at a relatively high speed, the recording element 87 producing on said chart a trace of its position. The advance of the chart 88 will thus continue until, with the cooled portion of the milk reaching the bulb 32 after its passage through the holding section, the tappet 83 is brought into engagement with the associated contacting elements, causing contacts 81 and 82 both to be opened. Separation of the contacts 82 will interrupt circuit to the motor 89, thus bringing the chart 88 to rest and terminating the graph produced thereon by the recording member 87 during the advance of said chart. Incidentally, opening of the contacts 81 will operate the flow diversion valve, as hereinbefore explained, so that any portion of the milk which may have been adversely affected by the lowering of temperature will be prevented from reaching the outlet of the system. As normal operation is restored, with a consequent increase of temperature measured by the bulb 31, the recording member 87 moving radially across the now stationary chart 88 will produce a distinctive terminating mark, as at $b$, on the graph inscribed thereon, whereby the length of time during which the motor 89 was in operation, corresponding to the holding time in the pasteurization system, may be precisely determined by inspection of the chart, which chart may be filed for record purposes.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Apparatus for measuring the time required for a charge to flow from one location to another in a conduit, comprising temperature-responsive means adapted to be positioned at the first location, other temperature-responsive means adapted to be positioned at the second location, recording means comprising a pen and a chart movable relatively to each other, means controlled by one of said temperature-responsive means for continuously operating said pen to record upon said chart, electrical means for actuating said chart, means controlled by the first temperature-responsive means in response to a change in temperature of said charge at said first location for energizing said electrical means to effect movement of said chart, and means controlled by the second temperature responsive means in response to a change in temperature at said second location for deenergizing said electrical means to stop movement of said chart.

2. Apparatus for measuring the time required for a charge to flow from one location to another in a conduit, comprising temperature-responsive means adapted to be positioned at the first location, other temperature-responsive means adapted to be positioned at the second location, recording means comprising a pen and a chart movable relatively to each other, means controlled by one of said temperature-responsive means for continuously operating said pen to record upon said chart, means for imparting motion to said chart at substantially constant speed, electrical switch means for controlling said motion-imparting means, and means controlled by the temperature-responsive means at said locations for actuating said switch means to cause movement of said chart by said motion-imparting means for an interval between successive changes in temperature at said location respectively.

3. Apparatus for measuring the time required for a charge to flow from one location to another in a conduit, comprising temperature-responsive means adapted to be positioned at the first location, other temperature-responsive means adapted to be positioned at the second location, recording means comprising a pen and a chart movable relatively to each other, means controlled by one of said temperature-responsive means for continuously operating said pen to record upon said chart, normally ineffective means for imparting motion to said chart at substantially constant speed, electrical switch means controlled by the first temperature-responsive means in response to a change in temperature of said charge at said first location for rendering said motion-imparting means effective to initiate movement of said chart, and other electrical switch means controlled by the second temperature-responsive means in response to a change in temperature at said second location to restore said motion-imparting means to ineffective condition to terminate movement of said chart.

FREDERICK A. FAUST.

REFERENCES CITED

The following references are of record in the file of this patent:

UNITED STATES PATENTS

| Number | Name | Date |
| --- | --- | --- |
| 1,222,492 | Thomas | Apr. 10, 1917 |
| 1,245,688 | Crewson | Nov. 6, 1917 |
| 1,614,702 | Wilson | Jan. 18, 1927 |
| 1,616,481 | Allen | Feb. 8, 1927 |
| 2,353,382 | Barrett | July 11, 1944 |